United States Patent
Klomp et al.

(10) Patent No.: US 12,054,159 B2
(45) Date of Patent: Aug. 6, 2024

(54) COMPUTER PROGRAM, COMMUNICATION CIRCUIT FOR A TRAILER, COMMUNICATION CIRCUIT FOR A VEHICLE, VEHICLE, TRAILER, AND METHODS FOR COMMUNICATION BETWEEN A VEHICLE AND A TRAILER

(71) Applicant: VOLKSWAGEN AKTIENGESELLSCHAFT, Wolfsburg (DE)

(72) Inventors: Sven Klomp, Dollbergen (DE); Philipp Hüger, Rühen (DE); Steffen Frerk, Braunschweig (DE); Hendrik-Jörn Günther, Peine (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 211 days.

(21) Appl. No.: 17/806,557

(22) Filed: Jun. 13, 2022

(65) Prior Publication Data
US 2022/0402501 A1 Dec. 22, 2022

(30) Foreign Application Priority Data
Jun. 16, 2021 (EP) .................................... 21179911

(51) Int. Cl.
*B60W 40/08* (2012.01)

(52) U.S. Cl.
CPC ......... *B60W 40/08* (2013.01); *B60W 2300/14* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 10,259,390 B2 | 4/2019 | Zhang et al. | |
| 2006/0250224 A1 | 11/2006 | Steffel et al. | |
| 2017/0254873 A1 | 9/2017 | Koravadi | |
| 2020/0156606 A1* | 5/2020 | Switkes | G08G 1/22 |
| 2020/0336870 A1 | 10/2020 | Back et al. | |
| 2020/0382925 A1 | 12/2020 | Doig et al. | |
| 2021/0245678 A1 | 8/2021 | Smits | |
| 2021/0370922 A1* | 12/2021 | Smith | B60W 30/18109 |

(Continued)

FOREIGN PATENT DOCUMENTS

| | | |
|---|---|---|
| DE | 102015120985 A1 | 6/2016 |
| DE | 102016008030 A1 | 2/2017 |
| DE | 102017111530 A1 | 11/2017 |

(Continued)

OTHER PUBLICATIONS

Search Report for European Patent Application No. 21179911.9; Dec. 3, 2021.

*Primary Examiner* — Justin S Lee
(74) *Attorney, Agent, or Firm* — Barnes & Thornburg LLP

(57) ABSTRACT

A computer program, a communication circuit for a trailer, a communication circuit for a transportation vehicle, a transportation vehicle, a trailer, and methods for communication between a transportation vehicle and a trailer. Provided is a method for communication between a transportation vehicle and a trailer which includes communicating a message between the transportation vehicle and the trailer using technology for communication between separate transportation vehicles.

24 Claims, 2 Drawing Sheets

(56) References Cited

U.S. PATENT DOCUMENTS

2022/0303743 A1* 9/2022 Lansford .................. B60D 1/62
2022/0388512 A1* 12/2022 Hayes ................... B60W 50/14

FOREIGN PATENT DOCUMENTS

| DE | 102018127088 A1 | 4/2020 |
| WO | 2004068164 A2 | 8/2004 |
| WO | 2020088855 A1 | 5/2020 |

* cited by examiner

COMPUTER PROGRAM, COMMUNICATION CIRCUIT FOR A TRAILER, COMMUNICATION CIRCUIT FOR A VEHICLE, VEHICLE, TRAILER, AND METHODS FOR COMMUNICATION BETWEEN A VEHICLE AND A TRAILER

PRIORITY CLAIM

This patent application claims priority to European Patent Application No. 21179911.9, filed 16 Jun. 2021, the disclosure of which is incorporated herein by reference in its entirety.

SUMMARY

Illustrative embodiments relate to a computer program, a communication circuit for a trailer, a communication circuit for a transportation vehicle, a transportation vehicle, a trailer, and methods for communication between a transportation vehicle and a trailer. In particular, illustrative embodiments relate to a concept for communication between a trailer and a transportation vehicle for a trailer assist system.

BRIEF DESCRIPTION OF THE DRAWINGS

Disclosed embodiments will be described with reference to the accompanying figures, in which.

DETAILED DESCRIPTION

Figure 1:
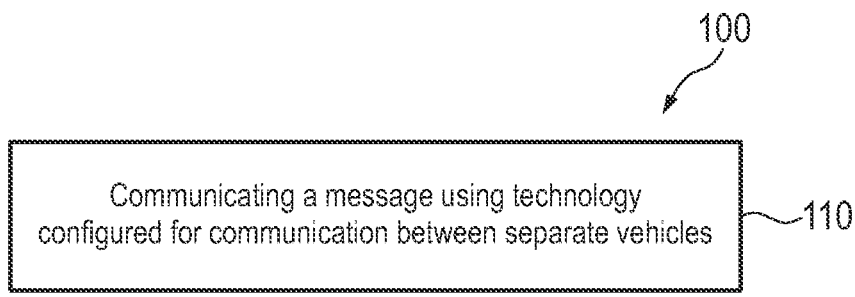
FIG. 1 shows a flow chart schematically illustrating an exemplary embodiment of a method for communicating between a transportation vehicle and a trailer.

Trailer assistance systems are systems that support a driver or an at least partially autonomous driving transportation vehicle in maneuvering a transportation vehicle and a trailer attached to the transportation vehicle. In some concepts for trailer assist systems, the driver can define a maximum angle between a driving direction of the transportation vehicle and the trailer and the trailer assist system maneuvers the transportation vehicle such that the maximum angle is not exceeded and collisions of the transportation vehicle and the trailer with surrounding object or transportation vehicles are avoided. Sensors installed at the transportation vehicle may have an insufficient field of view and/or range to provide sensor data of the environment of the trailer. Therefore, the trailer may be equipped with sensors and their sensor data may be transmitted to the transportation vehicle.

Document DE 10 2015120 985 A1 proposes a concept for identifying a trailer with a vehicle. For this, it is proposed to transmit a unique identifier to the vehicle using a wireless transmitter attached to the trailer. Also, it is proposed to sense a parameter of the trailer using a sensor and transmit the parameter to the vehicle for a trailer backup system after the unique identifier is recognized by a controller on the vehicle.

Document DE 10 2016 008 030 A1 proposes a vehicle with a towable object, e.g., a trailer, and a distance warning system for the vehicle. The distance warning system is connected to a distance sensing system of the towable object via a data line for transmitting information of the distance sensing system to the vehicle and evaluating the information.

US 2020/382 925 A1 discloses a method at a first computing device within an Intelligent Transportation System for vehicle length reporting. The method includes receiving, at the computing device, a position from a second computing device and finding position information for the first computing device. Further, the method includes calculating a difference between the position found for the first computing device and the position reported from the second computing device and using the difference for vehicle length reporting.

DE 10 2018 127088 A1 discloses an electrically controllable brake system for a vehicle-trailer combination comprising a towing vehicle and a trailer, having a towing vehicle brake system for braking the towing vehicle and a trailer brake system for braking the trailer. The braking systems each comprise a control device for electrically controlled actuation of the respective wheel brakes based on a braking request.

US 2017/254873 A1 discloses a communication system for vehicles including a first communication device disposed at a trailer and a second communication device disposed at a vehicle. The communication device wirelessly transmits a communication to the second communication device, and the second communication device receives the transmitted communication from the first communication device. Responsive to processing of the transmitted communication received by the second communication device, the communication system determines an angle of the trailer relative to the vehicle. The first and second communication devices may include first and second dedicated short range communication devices.

Accordingly, implementation of trailer assistance systems in transportation vehicles involves additional technical methods or mechanisms for the transportation vehicle and costs.

Hence, there is a demand for an improved concept for a transportation vehicle and/or a trailer.

This demand may be satisfied by the subject-matter of the appended independent and dependent claims.

Disclosed embodiments are based on the finding that technology for the use of communication between separate transportation vehicles, such as WLANp or Cellular vehicle-to-everything (C-V2X), may be also used or reused for communication between a transportation vehicle and a trailer and, thus, additional technical methods or mechanisms (e.g., receivers, processing circuits, processing routines, etc.) for the communication between the trailer and the transportation vehicle can be saved. Information that can be communicated in this way between the trailer and the transportation vehicle may be indicative of or comprise sensor data for a trailer assist system. Another finding is that the trailer may be also used for relaying information, e.g., from other transportation vehicles or infrastructure to the transportation vehicle using the technology for an increased communication range.

Disclosed embodiments provide a method for communicating between a transportation vehicle and a trailer. The method comprises communicating a message between the transportation vehicle and the trailer using technology configured for communication between separate transportation vehicles. This allows to save or at least reduce an amount of additional technical methods or mechanisms in the transportation vehicle, e.g., an additional receiver in addition to a receiver for communication with other transportation vehicles. Also, this may provide compatibility of the trailer with various transportation vehicles, e.g., of different car manufacturers.

The message comprises at least one of a Collective Perception Message, CPM, and a Cooperative Awareness Message, CAM. The formats of CAMs and CPMs is standardized and, thus, compatible with different transportation vehicles, e.g., of different car manufacturers. For communication between separate transportation vehicles and communication between transportation vehicles and infrastructure, methods or mechanisms (e.g., protocols and routines) for communication and processing of those formats are already implemented in transportation vehicles. The use of a CPM and/or a CAM for the message, thus, further saves or at least reduces additional technical effort for communicating and/or processing the message.

While the trailer is attached to the transportation vehicle, the position of the trailer can be derived from the position of the transportation vehicle and/or sensor data of sensors which are installed at the transportation vehicle and configured to monitor the trailer. So, the method may further comprise omitting information on the position of the trailer from the CPM and/or CAM, respectively. In this way, the size of the message and, thus, resources, e.g., bandwidth, computing power, energy and/costs, for generating, communicating, and processing the message can be saved.

Other exemplary embodiments provide a method for a transportation vehicle and for communicating with a trailer. The method comprises communicating with another transportation vehicle or an infrastructure component using technology configured for communication between separate transportation vehicles. The method also comprises receiving a message from the trailer using the technology configured for communication between separate transportation vehicles. Similar to what is described above, the method for the transportation vehicle allows to save additional technical methods or mechanisms in the transportation vehicle.

In particular, the technology may comprise technology for communication between separate transportation vehicles via a wireless local area network (WLAN) or using a mobile communications system. Accordingly, receiving the message may comprise receiving the message from the trailer via the wireless local area network or using the mobile communications system. The technology, e.g., comprises communication and processing methods or mechanisms, e.g., one or more receivers, transmitters, transceivers, interfaces, and/or processing circuits for communication via WLANp and/or C-V2X.

The message may be indicative of information on at least one of the trailer, an environment of the trailer, and an environment of the transportation vehicle. Thus, the message can be used to better assess the environment and the trailer, e.g., to better assess a behavior of the trailer (relative to the transportation vehicle or other transportation vehicles) or a distance of the transportation vehicle and/or the trailer to objects, other transportation vehicles, and/or persons in the environment of the transportation vehicle and the trailer.

In some exemplary embodiments, the method further comprises maneuvering the transportation vehicle based on the information. This allows to support a driver of the transportation vehicle in maneuvering the trailer and, e.g., to avoid collisions with other transportation vehicles, obstacles, and/or persons in the environment.

Further disclosed embodiments provide a method for a trailer and for communicating with a transportation vehicle. The method comprises transmitting a message to the transportation vehicle using technology configured for communication between separate transportation vehicles. Similar to what is described above, the method for the transportation vehicle allows to save additional components in the transportation vehicle.

Similar to what is described above, the technology, e.g., comprises technology for communication between separate transportation vehicles via a wireless local area network or a mobile communications system and transmitting the message may comprise transmitting the message to the transportation vehicle via the wireless local area network or using the mobile communications system.

In some exemplary embodiments, the method further comprises obtaining information on at least one of the trailer, an environment of the trailer, and an environment of the transportation vehicle, and the message is indicative of the information. Thus, the message can be used to better assess the environment and the trailer, e.g., to better assess a behavior of the trailer (relative to the transportation vehicle or other transportation vehicles) or a distance of the transportation vehicle and/or the trailer to objects, other transportation vehicles, and/or persons in the environment of the transportation vehicle and the trailer.

Obtaining the information may comprise receiving the information from a sensor installed on the trailer and/or receiving the information from another transportation vehicle. The sensor, e.g., is a Lidar sensor, a radar sensor, an ultrasonic sensor, a camera, or the like. Optionally, the information may be obtained from multiple and/or a combination of the aforementioned sensors.

Other exemplary embodiments provide a computer program having a program code for performing at least one of the methods proposed herein, when the computer program is executed on a computer, a processor, or a programmable hardware component.

Further exemplary embodiments provide a communication circuit for a transportation vehicle. The communication circuit comprises one or more interfaces configured to communicate in a communication network and a data processing circuit configured to control the one or more interfaces. The data processing circuit is further configured to execute one of the methods for the transportation vehicle which are proposed herein using the one or more interfaces.

Other exemplary embodiments provide a transportation vehicle comprising the communication circuit for a transportation vehicle.

Further exemplary embodiments provide a communication circuit for a trailer. The communication circuit comprises one or more interfaces configured to communicate in a communication network and a data processing circuit configured to control the one or more interfaces. The data processing circuit is further configured to execute one of the methods for the trailer which are proposed herein using the one or more interfaces.

Other exemplary embodiments provide a trailer comprising the communication circuit for a trailer.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a flow chart schematically illustrating an exemplary embodiment of a method 100 for communicating between a transportation vehicle and a trailer. Method 100 comprises communicating 110 a message between the transportation vehicle and the trailer using technology configured for communication between separate transportation vehicles.

In context of the present disclosure, transportation vehicles, such as the vehicle, can be understood as motor vehicles or power-driven vehicles having a motor for propulsion. The transportation vehicle can be any ground vehicle, a watercraft, or the like. For example, the transportation vehicle is a car, a bus, a truck, or the like. Further, the transportation vehicle may be configured for the use as towing vehicle. So, the transportation vehicle may exhibit methods or mechanisms for towing the trailer, e.g., a coupling device or tow hitch for hitching the trailer to the transportation vehicle. Optionally, the transportation vehicle may also have a socket for supplying the trailer with electric power and signals from the transportation vehicle for lights, e.g., rear lights, brake lights, and/or turn signal lights via a wired connection to the socket.

The trailer can be understood as an unpowered wagon that is configured and/or intended to be towed by a transportation vehicle. So, in difference to the transportation vehicle, disclosed embodiments of the trailer have no propulsion system itself, apart from any auxiliary motors for maneuvering within small ranges (e.g., a few meters or tens of meters). In particular, the trailer can be a utility trailer, a bicycle trailer, a construction trailer, a travel trailer, a semi-trailer, a full trailer, close-coupled trailer, motorcycle trailer, livestock trailer, boat trailer, or the like.

In context of the present disclosure, the technology configured for communication between separate transportation vehicles can be understood as technology configured to communication between motor vehicles or power-driven vehicles. In particular, the technology comprises technology of a communication standard (e.g., 802.11p of the Institute of Electrical and Electronics Engineers, IEEE, and/or TS 103 324 of the European Telecommunications Standards Institute, ETSI) for wireless communication between separate transportation vehicles. For example, the technology comprises a vehicular communication system and/or methods or mechanisms for communication using dedicated short-range communications (DSRC), a vehicular ad hoc network (VANET), C-V2X, WLANp, and/or the like for communication between separate transportation vehicles. In exemplary embodiments, the technology comprises, e.g., one or more WLAN interfaces, PC5 interfaces, Uu interfaces, and/or respective processing methods or mechanisms.

In some disclosed embodiments, the technology may be also used for vehicle-to-infrastructure (V2I) and/or vehicle-to-pedestrian (V2P) communication.

For communication between the transportation vehicle and the trailer, the trailer and the transportation vehicle are equipped with methods or mechanisms, e.g., transmitters, receivers, transceivers, and suitable processing methods or mechanisms (e.g., processing hardware/circuits and software) of the technology. The transportation vehicle may already be equipped with the technology for communication with other transportation vehicles which is why the technical effort for the implementation of communication between the transportation vehicle and the trailer may be reduced vis-á-vis concepts providing for a separate technology in addition to the technology for communication between separate transportation vehicles. Accordingly, the functionality of the technology is increased.

In exemplary embodiments, communicating 110 the message comprises transmitting the message from the trailer to the transportation vehicle and/or transmitting the message from the transportation vehicle to the trailer. In particular, the message may be sent wirelessly. For communicating 110 the message, the message may be encoded in a wireless signal sent by the above technology.

The message, e.g., comprises or corresponds to at least one of a Collective Perception Message (CPM) and a Cooperative Awareness Message (CAM). For communication with other transportation vehicles, methods or mechanisms (e.g., protocols, routines, etc.) for communicating and processing CPMs and/or CAMs may be already implemented. Hence, the communication of the message may involve less or ideally no further technical effort for communicating and/or processing the message.

In exemplary embodiments, optionally a message other than the CAM or CPM may be used.

In some disclosed embodiments, the message may be indicative of information on the trailer, an environment of the trailer, and/or an environment of the transportation vehicle. Such information, e.g., is indicative of sensor data of one or more sensors (e.g., distance sensors, cameras, Lidar sensors, radar sensors, ultrasonic sensors, wheel speed sensors, a combination thereof, etc.) installed at the transportation vehicle and/or at the trailer. The information on the trailer, e.g., is indicative of a size, shape, velocity, and/or position of the trailer. The information on the trailer may be predetermined and/or measured using any of the sensors. The information on the environment of the transportation vehicle and the trailer, e.g., is indicative of a position of one or more other transportation vehicles in their environment and/or a position and/or a distance of the transportation vehicle and/or the trailer relative to one or more other transportation vehicles.

The information, e.g., is used in a driving assistance system for maneuvering the transportation vehicle and/or in a trailer assist system for maneuvering the transportation vehicle together with the trailer attached to the transportation vehicle. The driving assistance system and/or trailer assist system, e.g., at least partly automatically maneuvers the transportation vehicle together with the trailer based on the information and/or displays the information, e.g., the distance of the transportation vehicle/trailer to other transportation vehicles to a driver of the transportation vehicle to help the driver to "manually" maneuver the transportation vehicle together with the trailer. The trailer assist system, e.g., steers, accelerates, and/or brakes the transportation vehicle automatically based on the information on the environment of the transportation vehicle and the trailer. Optionally, the trailer assist system displays the information on the environment to the driver on a screen.

Optionally, the information on the environment further indicates a (relative) position of the trailer (relative to the transportation vehicle). In some exemplary embodiments, the (relative) position of the trailer (relative to the transportation vehicle) may be obtained using sensors of the transportation vehicle which is why the information on the (relative) position of the trailer (relative to the transportation vehicle) can be also omitted from the message (CAM/CPM), e.g., to save resources (e.g., bandwidth, computing power, energy and/costs) for generating, communicating, and/or processing the message. To do so, the information on the position can be considered "non-mandatory" for the trailer and/or left out from the CAM/CPM when generating the CAM/CPM or deleted from the CAM/CPM afterwards.

In some disclosed embodiments, the information may be indicative of information which the trailer and/or the transportation vehicle received from one or more other transportation vehicles, e.g., to forward the information between the transportation vehicle or the trailer and the one or more other transportation vehicles.

As stated in more detail below, method 100 may be at least partly implemented in and/or through separate methods for the transportation vehicle and the trailer. It is noted that explanations to features described in connection with method 100 may, therefore, also apply to respective methods for a transportation vehicle and a trailer which are described below.

Figure 2:
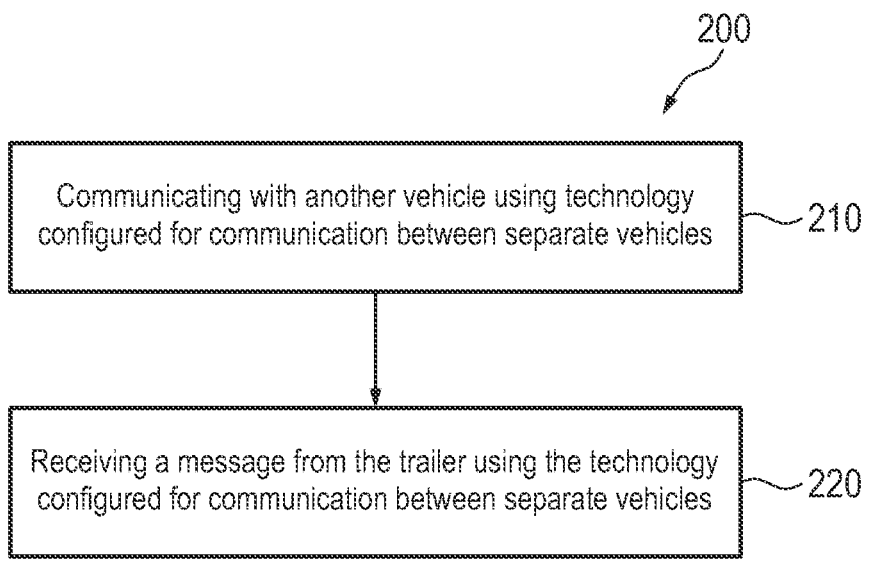
FIG. 2 shows a flow chart schematically illustrating an exemplary embodiment of a method for a transportation vehicle and for communicating with a trailer.

FIG. 2 shows a flow chart schematically illustrating an exemplary embodiment of a method 200 for a transportation vehicle and for communicating with a trailer.

As can be seen from the flow chart, method 200 comprises communicating 210 with another transportation vehicle or an infrastructure component using technology configured for communication between separate transportation vehicles. Similar to what is described above, the technology can be understood as technology configured to communication between motor vehicles or power-driven vehicles and may comprise technology for wireless communication between separate transportation vehicles. In particular, the technology may comprise methods or mechanisms for communication via a wireless local area network or a mobile communications system. The technology for communication via WLAN, e.g., comprises a WLANp interface. The mobile communications system can be understood as communications system configured for communication via a mobile communications network as well as through C-V2X. In disclosed embodiments, the mobile communications system, e.g., comprises a PC5 interface and/or a Uu interface installed at the transportation vehicle.

Method 200 further comprises receiving 220 a message (e.g., a CAM or a CPM) from the trailer using the technology, e.g., the WLANp, PC5, and/or Uu interface, configured for communication between separate transportation vehicles. In this way, additional interfaces specifically for communicating with the trailer may be saved.

Similar to what is described above, the message may be indicative of information on at least one of the trailer, an environment of the trailer, and an environment of the transportation vehicle. So, the message can be used in a driving assistance and/or a trailer assist system. Accordingly, method 200 may further comprise maneuvering the transportation vehicle based on the information, e.g., for backing up the transportation vehicle together with the trailer safely. Optionally, the information is displayed to a driver of the transportation vehicle to help the driver to maneuver the transportation vehicle together with the trailer.

Figure 3:
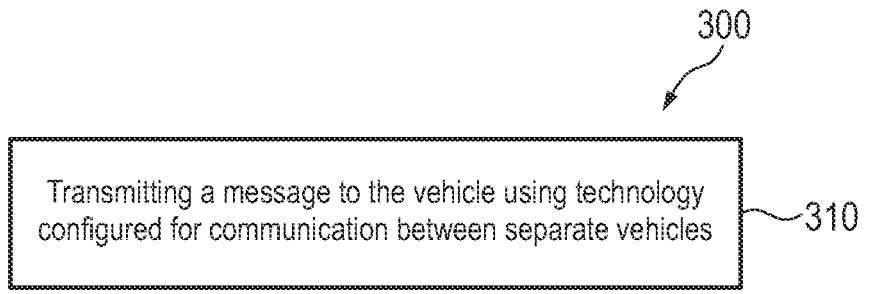
FIG. 3 shows a flow chart schematically illustrating an exemplary embodiment of a method for a trailer and for communicating with a transportation vehicle.

FIG. 3 shows a flow chart schematically illustrating an exemplary embodiment of a method 300 for a trailer and for communicating with a transportation vehicle.

Method 300 comprises transmitting a message to the transportation vehicle using technology configured for communication between separate transportation vehicles. Similar to what is described above, the technology may comprise technology which is installed at the trailer and configured for communication between separate transportation vehicles via a wireless local area network and/or a mobile communications system for transmitting the message via the WLAN and/or the mobile communications system.

It is noted that explanations of features in connection with method 100, 200, or 300 may also apply to another of the methods.

Figure 4:
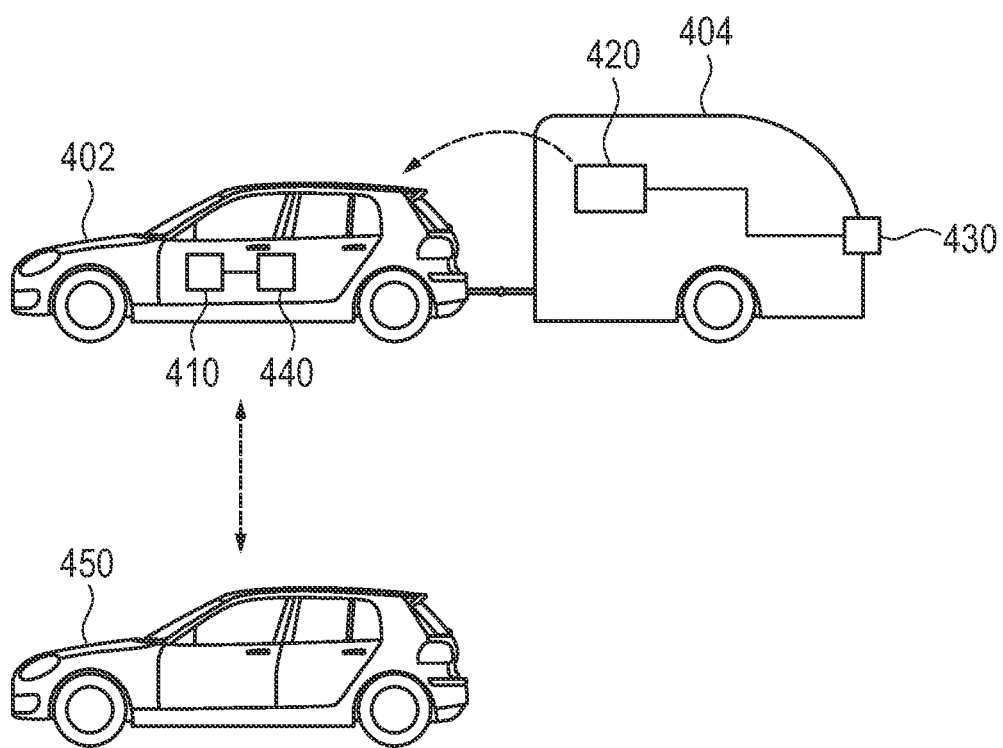
FIG. 4 shows a block diagram illustrating a use case of the disclosed concept.

Facets and features of the proposed concept should be illustrated in more detail with reference to FIG. 4 which shows a block diagram illustrating an exemplary use case of the proposed concept. In particular, FIG. 4 shows a use case of the proposed concept in for a trailer assist system.

The block diagram illustrates a first transportation vehicle 402, a second transportation vehicle 450, and a trailer 404 attached to the first transportation vehicle 402.

The first transportation vehicle 402 comprises a communication circuit 410 comprising a PC5 and/or a WLANp interface for communication (illustrated by the double-headed arrow in FIG. 4) with other transportation vehicles, here the second transportation vehicle 450. For example, the first transportation vehicle 402 exchanges a CPM and/or CAM with the second transportation vehicle 450 using the communication circuit 410. For this, the second transportation vehicle 450 may be equipped with another PC5 and/or another WLANp interface.

The trailer 404 comprises a sensor system 430 comprising an environmental sensor which is configured to monitor the environment of the trailer. In particular, the sensor system 430 may be configured to monitor and generate sensor data of an environmental area that is not or only partially "visible" for sensors (e.g., distance sensors and/or a rear view camera) (not shown) of the first transportation vehicle 402, e.g., behind the trailer 404. The sensor data, e.g., is indicative of a distance or relative position of objects and/or other transportation vehicles behind the trailer.

The sensor system 430 is coupled to a communication circuit 420 comprising a further PC5 and/or a WLANp interface configured for communication with the first and the second transportation vehicle 450 and 404. So, the communication circuit 420 may be equivalent to communication circuit 410 with regard to its function, the communication with other transportation vehicles. The communication circuit 420 may receive the sensor data from the sensor system 430 and generate a CPM indicative of the sensor data and of the monitored environment and transmit (indicated by the "single-headed" arrow) the CPM to the first transportation vehicle 402. For this, the sensor data may be processed by the sensor system or a separate processing circuit such they can be sent through the CPM. The sensor data, e.g., is image or video data which may be inappropriate to be sent using a CPM and may, therefore, be processed to extract high level information (e.g., positions of surrounding transportation vehicles or objects) which can be sent through the CPM from the image or video data. The first transportation vehicle 402 uses the communication circuit 410 to receive the CPM and extract the sensor data from the CPM. It is noted that also other types of messages, e.g., a CAM may be used.

The first transportation vehicle 402 also comprises a trailer assist system 440. The trailer assist system 440, e.g., is configured to process the sensor data, display information on the monitored environment based on the sensor data to a driver of the first transportation vehicle and/or to maneuver the first transportation vehicle 402 together with the trailer 404 at least partly automatically, e.g., to steer, brake, and/or accelerate automatically. In this way, the trailer assist system 440 may support the driver to maneuver the first transportation vehicle 402 together with the trailer 404 safely, e.g., to avoid collisions with objects in the monitored environment.

It is noted that the proposed concept may be also implemented for other purposes, e.g., for communication between separate transportation vehicles. In the present use case, the proposed concept, e.g., is optionally used for communication between the first and the second transportation vehicle 402 and 450 via the communication circuit 420.

The proposed concept may be also implemented in a communication circuit for a transportation vehicle and/or a communication circuit for a trailer.

Such an implementation is described with reference to FIG. 5 which shows a block diagram schematically illustrating an exemplary embodiment of a communication circuit 510 for a transportation vehicle 502 and a communication circuit 520 for a trailer 504.

As can be seen from the block diagram, the communication circuits 510 and 520 each comprise one or more interfaces 512 configured to communicate in a communication network and a data processing circuit 514 configured to control the one or more interfaces 512. Further, the data processing circuit 514 is configured to execute method 200 or 300, respectively, using the one or more interfaces 512.

In disclosed embodiments, the one or more interfaces 512 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 512 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 512 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc.

Figure 5:
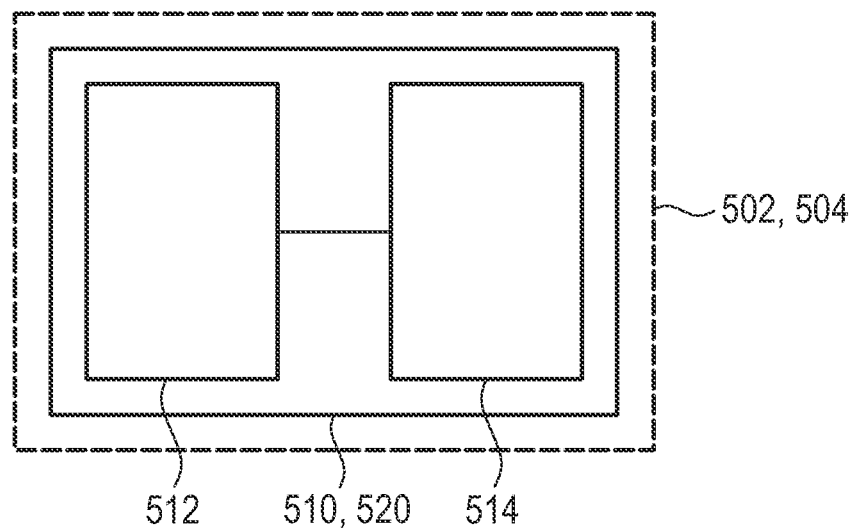
FIG. 5 shows a block diagram schematically illustrating an exemplary embodiment of a communication circuit for a vehicle/trailer.

As shown in FIG. 5 the respective one or more interfaces 512 are coupled to the respective data processing circuit 514 of the communication circuit 510 or 520, respectively. In disclosed embodiments, the data processing circuit 514 may comprise any method or mechanism for processing information according to method 100, 200, or 300, respectively. The data processing circuit may be implemented using one or more processing units, one or more processing devices, any method or mechanism for processing, such as a processor, a computer or a programmable hardware component being operable with accordingly adapted software. In other words, the described functions of the data processing circuit 514 may as well be implemented in software, which is then executed on one or more programmable hardware components. Such hardware components may comprise a general-purpose processor, a Digital Signal Processor (DSP), a micro-controller, etc.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosed embodiments and the concepts contributed to furthering the art and are to be construed as being without limitation to such specifically recited examples and conditions. Moreover, all statements herein reciting principles and embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that, although a dependent claim may refer in the claims to a specific combination with one or more other claims, other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

100 method
110 communicating a message using technology for communication between separate transportation vehicles
200 method for a transportation vehicle
210 communicating with another transportation vehicle using technology configured for communication between separate transportation vehicles
220 receiving a message from the trailer using the technology configured for communication between separate transportation vehicles
300 method for a trailer
310 transmitting a message to the transportation vehicle using technology configured for communication between separate transportation vehicles
402 first transportation vehicle
404 trailer
410 communication circuit
420 communication circuit
430 sensor system
440 trailer assist system
450 second transportation vehicle
502 transportation vehicle
504 trailer
510 communication circuit
512 one or more interfaces
514 data processing circuit
520 communication circuit

The invention claimed is:

1. A communication circuit for a transportation vehicle, the communication circuit comprising:
   one or more interfaces configured to communicate in a communication network; and
   a data processing circuit configured to control the one or more interfaces,
   wherein the data processing circuit is configured to use the one or more interfaces to enable communication of a transportation vehicle with a trailer using technology for communication between separate transportation vehicles,
   wherein a message is received from the trailer using the technology for communication between separate transportation vehicles,
   wherein the message comprises at least one of a Collective Perception Message (CPM) and a Cooperative Awareness Message (CAM), and
   wherein information indicating a position of the trailer is omitted from the CPM and/or CAM based communication in response to a determination that position of the trailer is otherwise determinable by the transportation vehicle.

2. The communication circuit of claim 1, wherein the technology comprises technology for communication between separate transportation vehicles via a wireless local area network or a mobile communications system, and wherein the received message is received from the trailer via the wireless local area network or using the mobile communications system.

3. The communication circuit of claim 1, wherein the message is indicative of information regarding at least one of the trailer, an environment of the trailer, and an environment of the transportation vehicle.

4. The communication circuit of claim 3, wherein the communication circuit further comprises maneuvering the transportation vehicle based on the information in the message.

5. A transportation vehicle comprising the communication circuit of claim 1.

6. A communication circuit for a trailer, the communication circuit comprising:
   one or more interfaces configured to communicate in a communication network; and
   a data processing circuit configured to control the one or more interfaces, wherein the data processing circuit is configured to use the one or more interfaces to enable communication of the trailer with a transportation vehicle using technology configured for communication between separate transportation vehicles,
   wherein the trailer transmits a message that comprises at least one of a Collective Perception Message (CPM) and a Cooperative Awareness Message (CAM), and
   wherein information indicating a position of the trailer is omitted from the CPM and/or CAM based communication in response to a determination that position of the trailer is otherwise determinable by the transportation vehicle.

7. The communication circuit of claim 6, wherein the technology comprises technology for communication between separate transportation vehicles via a wireless local area network or a mobile communications system, and wherein the transmitted message is transmitted to the transportation vehicle via the wireless local area network using the mobile communications system.

8. The communication circuit of claim 6 wherein information regarding at least one of the trailer, an environment of the trailer, and an environment of the transportation vehicle is obtained, and wherein the message is indicative of the information regarding at least one of the trailer, an environment of the trailer, and an environment of the transportation vehicle.

9. A trailer comprising the communication circuit of claim 6.

10. A method for communicating between a transportation vehicle and a trailer, the method comprising:
communicating a message between the transportation vehicle and the trailer using technology for communication between separate transportation vehicles, wherein the message comprises at least one of a Collective Perception Message (CPM) and a Cooperative Awareness Message (CAM),
wherein information indicating a position of the trailer is omitted from the CPM and/or CAM based communication in response to a determination that position of the trailer is otherwise determinable by the transportation vehicle.

11. A method for a transportation vehicle and for communicating with a trailer using technology for communication between separate transportation vehicles, the method comprising:
receiving a message from the trailer using the technology for communication between separate transportation vehicles, wherein the message comprises at least one of a Collective Perception Message (CPM) and a Cooperative Awareness Message (CAM),
wherein information indicating a position of the trailer is omitted from the CPM and/or CAM based communication in response to a determination that position of the trailer is otherwise determinable by the transportation vehicle.

12. The method of claim 11, wherein the technology comprises technology for communication between separate transportation vehicles via a wireless local area network or a mobile communications system, and wherein the received message is received from the trailer via the wireless local area network or using the mobile communications system.

13. The method of claim 11, wherein the message is indicative of information regarding at least one of the trailer, an environment of the trailer, and an environment of the transportation vehicle.

14. The method of claim 13, wherein the method further comprises maneuvering the transportation vehicle based on the information in the message.

15. A method for a trailer and for communicating with a transportation vehicle using technology configured for communication between separate transportation vehicles, the method comprising:
transmitting a message from the trailer using the technology for communication between separate transportation vehicles,
wherein the message comprises at least one of a Collective Perception Message (CPM) and a Cooperative Awareness Message (CAM); and
wherein information indicating a position of the trailer is omitted from the CPM and/or CAM based communication in response to a determination that position of the trailer is otherwise determinable by the transportation vehicle.

16. The method of claim 15, wherein the technology comprises technology for communication between separate transportation vehicles via a wireless local area network or a mobile communications system, and wherein the transmitted message is transmitted to the transportation vehicle via the wireless local area network using the mobile communications system.

17. The method of claim 15, further comprising obtaining information regarding at least one of the trailer, an environment of the trailer, and an environment of the transportation vehicle, and wherein the message is indicative of the information regarding at least one of the trailer, an environment of the trailer, and an environment of the transportation vehicle.

18. A non-transitory computer readable medium including a computer program having a program code for performing the method of claim 10, when the computer program is executed on a computer, a processor, or a programmable hardware component.

19. A non-transitory computer readable medium including a computer program having a program code for performing the method of claim 11, when the computer program is executed on a computer, a processor, or a programmable hardware component.

20. A non-transitory computer readable medium including a computer program having a program code for performing the method of claim 15, when the computer program is executed on a computer, a processor, or a programmable hardware component.

21. The communication circuit of claim 1, wherein the position of the trailer is otherwise determinable by the transportation vehicle from data generated by one or more sensors positioned on the transportation vehicle or from data one or more other transportation vehicles.

22. The communication circuit of claim 6, wherein the position of the trailer is otherwise determinable by the transportation vehicle from data generated by one or more sensors positioned on the transportation vehicle or from data one or more other transportation vehicles.

23. The method of claim 10, wherein the position of the trailer is otherwise determinable by the transportation vehicle from data generated by one or more sensors positioned on the transportation vehicle or from data one or more other transportation vehicles.

24. The method of claim 15, wherein the position of the trailer is otherwise determinable by the transportation vehicle from data generated by one or more sensors positioned on the transportation vehicle or from data one or more other transportation vehicles.

* * * * *